July 22, 1969 W. H. E. WIDL 3,457,511

ARRANGEMENT FOR AUTOMATIC TRANSIT TIME COMPENSATION IN PARALLEL DATA TRANSMISSION SYSTEMS

Filed Aug. 17, 1966 3 Sheets-Sheet 1

INVENTOR.
WALTER HERBERT ERWIN WIDL

BY Hane and Nydick
ATTORNEYS

INVENTOR.
Walter Herbert Erwin Widl
BY Hane and Nydick
Attorneys

WALTER HERBERT ERWIN WIDL
INVENTOR.
BY Hane and Nydick
ATTORNEYS

United States Patent Office 3,457,511

Patented July 22, 1969

3,457,511

ARRANGEMENT FOR AUTOMATIC TRANSIT TIME COMPENSATION IN PARALLEL DATA TRANSMISSION SYSTEMS

Walter Herbert Erwin Widl, Bandhagen, Sweden, assignor to Telefonaktiebolaget L. M. Ericsson, Stockholm, Sweden, a corporation of Sweden Filed Aug. 17, 1966, Ser. No. 573,094
Claims priority, application Sweden, Aug. 30, 1965, 11,270/65
Int. Cl. H04b 1/02, 15/00
U.S. Cl. 325—42 7 Claims

ABSTRACT OF THE DISCLOSURE

In a multichannel data transmission system, apparatus compensates for the difference in time between bit signals being received from different channels. The apparatus includes a plurality of controllably variable delay means which delay the bit signals of each channel in accordance with the amplitude of control signals. The amplitude of each control signal is determined by the time difference between the arrival of the first bit signal in any channel and the time of arrival of the bit signal in the channel associated with the delay means being controlled by a control signal.

The present invention refers to an arrangement intended to be connected to the channel demodulators of the receiver side in a data transmission system working with parallel data transmission for automatic compensation of transit time differences between parallel data channels wherein, preceding the actual transmission of data, a testing information is sent out, for example a 010101-information with a period of two signal elements for carrying out the transit time compensation.

Figure 1:
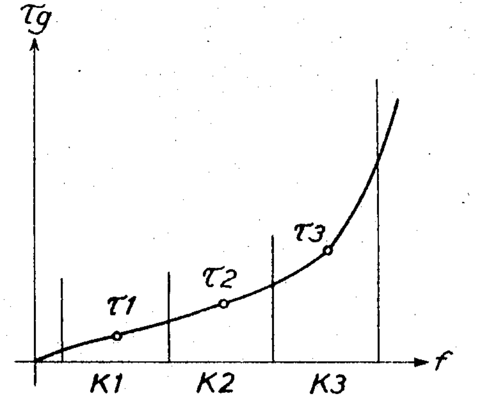
Figure 2:
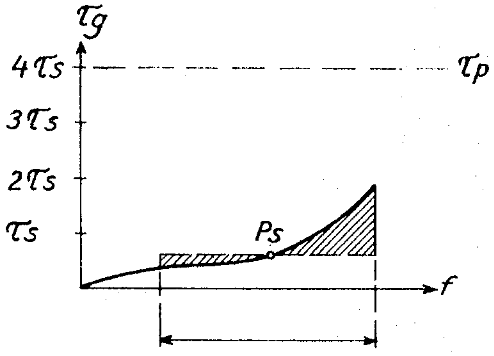
Figure 3:
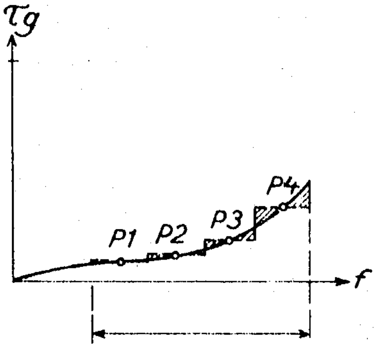

The transmission capacity of the most important transmission media, coil-loaded connections and carrier frequency channels, are limited by the transit time. Suitably constructed data transmission equipments tolerate a transit time distortion corresponding to a signal element. In FIG. 1 the group transit time is shown as a function of the frequency. In the example shown, the connection or link comprises three channels K1, K2 and K3 with the transit times $\tau 1$, $\tau 2$ and $\tau 3$ respectively. In FIGS. 2 and 3 the group transit time curve for the same coil-loaded connection is shown, but with the difference that the connection is utilized in different ways in the two cases. In FIG. 2 the connection is used for a series channel and in FIG. 3 for four parallel channels. The group transit time is obtained as the difference between the transit time curve of the connection and a horizontal line through the group transit time at the middle of the channel. The transit time axis is divided in multiples of signal element lengths. A comparison between FIG. 2 and FIG. 3 shows that owing to the relatively slow signal elements of the parallel system and narrow channel widths, the signal element will, in each parallel channel, be distorted to a considerably smaller extent than the signal element in the series channel. The total transit time distortion of the series channel over the band is about $1.5\tau s$, while the maximum transit time distortion of the parallel channel is about $0.2\tau p$.

In a parallel data system the signal elements in each channel are fed at the same time from the sender side. At the receiver side, however, time differences between the signal elements occur due to the transit time distortion according to FIG. 3. Provided that the maximum time difference (between the points P1 and P4 in FIG. 3) is at the most equal to $\tau p$, the time differences may be eliminated by sampling at the same speed as the modulation speed. The parallel data system according to FIG. 3 thereby tolerates a distortion that is about twice as big as the series system according to FIG. 2. The transit time distortion is compensated in series transmission by phase shifting networks (compensation in the frequency plane) connected in cascade to the line or by combinations of delay networks and attenuators (compensation in the time plane). An automatic compensation of series channels thereby leads to quite complex equipments.

The present invention has an object of providing an arrangement for automatic transit time compensation for parallel data transmission. As a basic principle, the transit time difference of the channels is measured and the transit time for each channel is compensated up to a time corresponding to $0.9\ \tau p$. The invention contemplates that a delay circuit is connected to the output of the respective channel modulator. The delay circuit has its output connected partly to an output for the data flow, partly to a first input of an integration circuit, partly to an input of a first or-circuit, the output of which being connected to one of the inputs of an and-circuit, and partly to the input of a monostable switch circuit, the output of which latter in series with a derivating circuit is connected partly to an input of a second or-circuit, the output of which or-circuit in series with a monostable switch circuit and a derivating circuit is connected to the other input of said and-circuit, the output of which and-circuit is connected to a second input of the integration circuit, partly to a third input of the same circuit, said second input being adapted to open the circuit and said third input being adapted to close the circuit, and a holding circuit connected to the output of the integration circuit, the output of the holding circuit being in its turn connected to an arrangement in said delay circuit, the circuits being arranged in such a way, that partly upon a transition from 0 to 1 indicated the first time in the testing information all of the integration circuits are opened, partly upon each transition from 0 to 1 the respective integration circuit is closed, each integration circuit being loaded to a voltage corresponding to the time difference between the respective data channel and the channel with the first-indicated 0–1 transition, voltages obtained in the integration circuits being transmitted to said holding circuits which in their turn decrease the delay in the delay circuits.

The invention will be described in greater detail with reference to the accompanying drawings which show by way of example and not limitation, apparatus for practicing the invention.

Figure 4:
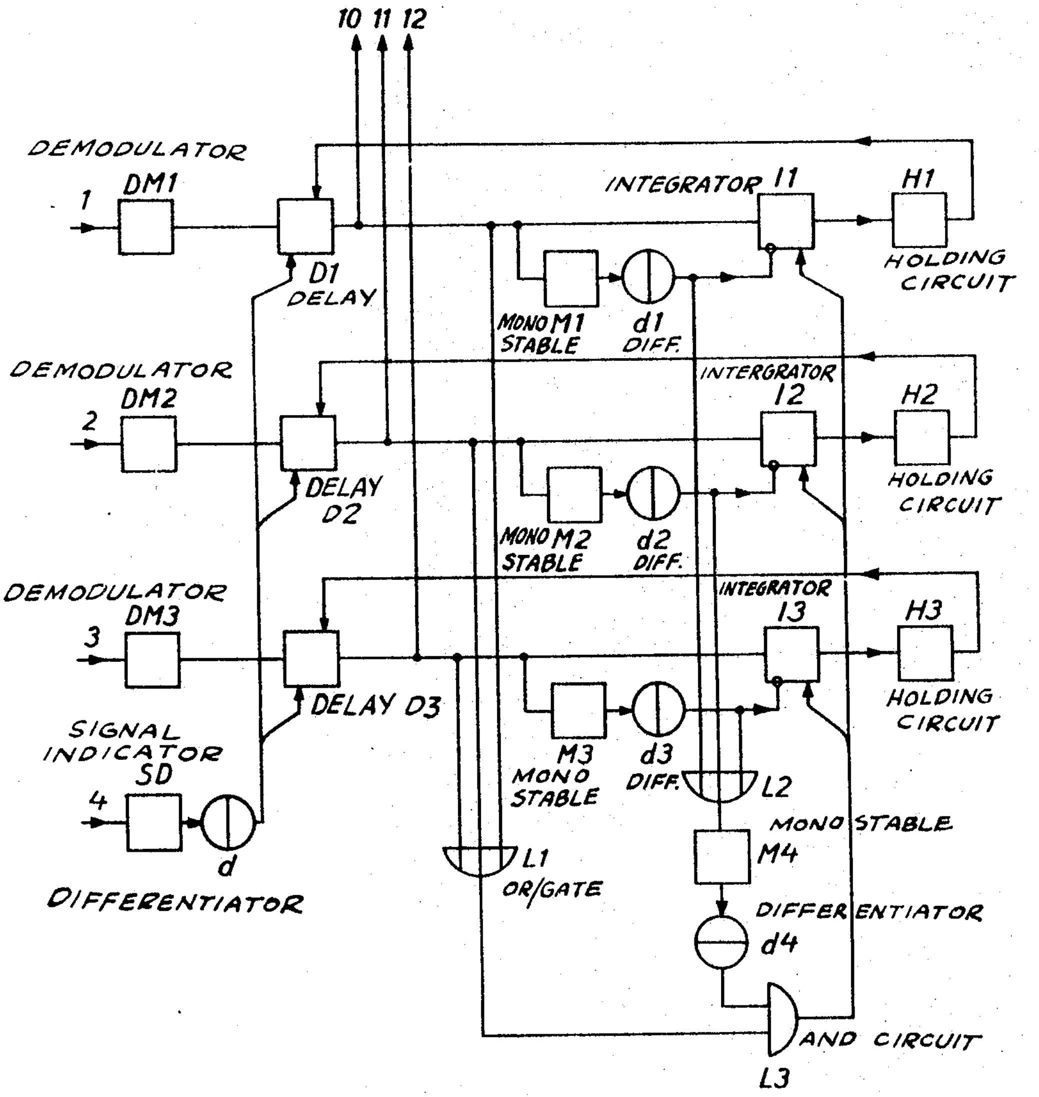

In the drawings, FIG. 1 shows a graph of group transit time of signals as a function of frequency in transmission channels. FIG. 2 shows a similar graph for a series channel, and FIG. 3 shows a similar graph for four parallel channels. FIG. 4 shows an arrangement for transit time compensation according to the invention and FIG. 5 shows voltages occurring as a function of the time at different points of the arrangement.

In FIG. 1 the group transit time is shown as a function of the frequency in a parallel data system comprising three data channels, K1, K2 and K3. The group transit time in the respective channel is labeled $\tau 1$, $\tau 2$, and $\tau 3$. At the receiver side of the transmission system the delay networks D1, D2 and D3 are connected to the respective channel modulators DM1, DM2 and DM3 (see FIG. 4). Each delay network D connected to the lines 1, 2 and 3 has its output connected partly to an output of the data lines 10, 11, 12 respectively, and partly to the input of an integrating circuit I1, I2 and I3 respectively. The outputs of the integration circuits are connected via the holding circuits H1, H2 and H3 to the respective delay networks. Betwen the output of each delay network D and a second input of the associated integration circuit 11, 12 or 13 a monostable switch circuit M1, M2 or M3 is connected in series with a differentiating network *d*1, *d*2 or *d*3. The outputs of the differentiating networks *d*1, *d*2 and *d*3, are also connected to the inputs of an or-circuit L2. The output of or-circuit L2 is connected to a monostable circuit M4, whose output is connected to a differentiating network *d*4. The output of differentiating network *d*4 is connected to a first input of an and-circuit L3. The other input of the and-circuit L3 is connected to the output of an or-circuit L1, whose inputs are connected to the outputs of the delay networks D1, D2 and D3. The output of the and-circuit L3 is connected to a third input of the integrating circuits I1, I2 and I3. For the zero-adjustment of the delay networks D1, D2 and D3 there is moreover a signal indicator SD connected to a particular channel 4. The output of indicator SD is connected to the delay networks D1, D2 and D3 via a differentiating network *d*.

Figure 5:
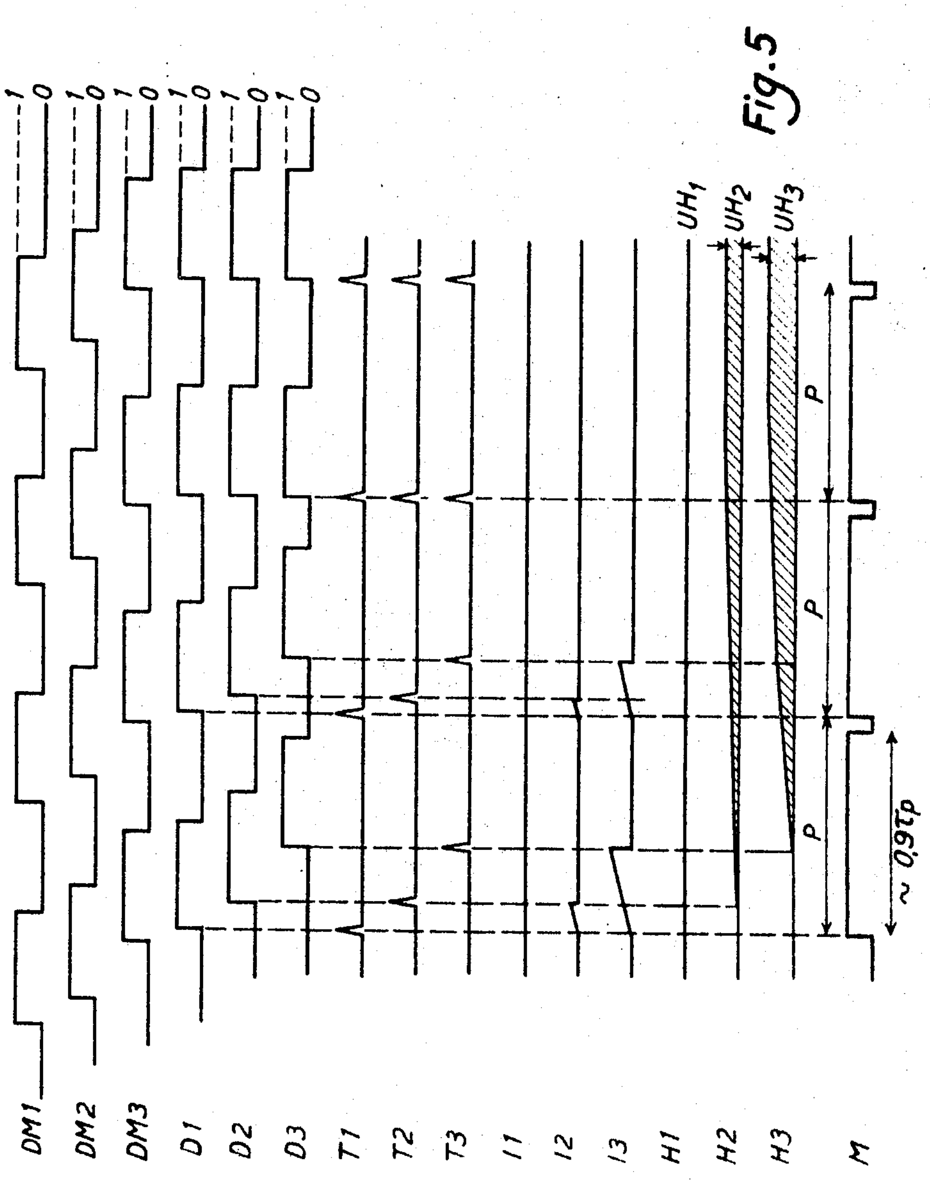

In FIG. 5 a testing information is shown in the form of a 010101-information coming from the lines 1, 2 and 3. The signal has then been group filtered and been demodulated in the channel demodulators DM1, DM2 and DM3. The outputs of the demodulators DM1, DM2 and DM3, in response to this information are shown by the similarly referenced voltage waveforms. Hereinafter, the waveform at the output of a unit bears the same reference character as the unit unless otherwise indicated. These voltages are delayed in delay networks D1, D2, D3 respectively to become the voltages D1, D2 and D3 in FIG. 5. Upon the first occurring 0–1 transition from any of the networks D1, D2 or D3 all of the integrating circuits I1, I2 and I3 will be opened. In the example, this occurs because of the voltage at the output of the delay network D1. This voltage is fed via the or-circuit L1 to one of the inputs of the and-circuit L3. The volatge from network D1 also operates the monostable circuit M1 and the differentiating circuit *d*1, whose output delivers a voltage pulse via the or-circuit L2 to the input of monostable circuit M4. Circuit M4 delivers a pulse via differentiating circuit d4 to the second input of and-circuit L3. Accordingly, a voltage that opens all of the integrating circuits is obtained on the output of the and-circuit L3. The voltage pulses obtained at the outputs of the respective differentiating circuits *d*1, *d*2 and *d*3 are, in FIG. 5, labelled T1, T2 and T3. These voltage pulses are thus supplied to the or-circuit L2. They are also fed to the respective integrating circuit I1, I2, and I3, where, when arriving, close the circuit. Upon the first 0–1-transistion all of the circuits I1, I2 and I3 will be opened. At the same time, however, the integrating circuit I1 will be closed. The circuit 12 will not be closed before a pulse occurs at the output of the differentiating network *d*2 and the circuit I3 when a pulse is obtained from the network *d*3. In this way the integrating circuits will be loaded to voltages proportional to the time differences between pulses T2 and T1 and between T3 and T1. The monstable switch circuit M4 is connected to operate for the period between two signal elements, so that, by means of the and-circuit L3, other 0–1 transitions, that may occur within a period, cannot open the integrating circuits.

When the integration circuits are closed voltages proportional to said time differences are thus obtained. The voltages are thereby stored in the respective holding circuits H1, H2 and H3. These circuits are constructed in such a way that they can actuate elements in the delay networks D1, D2 and D3, so that the delay in these networks is decreased. The voltages obtained in the respective holding circuits are indicated on the lines H1, H2 and H3 in FIG. 5 and labelled UH1, UH2 and UH3. In the holding circuit H1 no voltage is obtained because the integrating circuit I1 is never opened.

The holding circuits H1, H2 and H3 may for example be counters, that are arranged to actuate variable shift registers, of servo controlled potentiometers, that are arranged to actuate monostable switch circuits.

As can be seen from FIG. 5 the compensation time of transit time differences depends on the reaction speed in the circuits H1, H2 and H3 and in D1 the networks, D2 and D3. In the example shown, three periods are required for obtaining a satisfactory compensation. After some more periods, for example five, it may be presumed that the difference between the voltages UH1 and UH2 is constant, and so the circuits H and D may be locked, so that sending of the actual data flow may start.

Upon using a suitable testing information and a corresponding dimensioning of the H- and D-circuits the compensation arrangement may be constructed for the compensation of transit time differences greater than 0.9 $\tau$ *p*. (In the shown example the limit is about 0.9 $\tau$ *p*.). Moreover the number of channels may be arbitrarily increased.

I claim:

1. In a multichannel parallel data transmission system which includes a transmitter for sending data as coded combinations of signals representing 0-bits and 1-bits simultaneously over a plurality of channels, the data signals in each channel being preceded by a test information signal representing alternate 0-bits and 1-bits, and which further includes a receiver for receiving in parallel from the channels the data signals and the test information signals, an apparatus for automatically compensating for time differences between the signals received from the channels comprising:

(a) a plurality of controllably variable delay means, each having an input connected to one of the channels;

(b) a control input for varying the delay in accordance with the amplitude of a received control signal and an output;

(c) a plurality of control signal generator means each generating a control signal having an amplitude related to the time of operation of the generator means, each of said generator means including a start-operation control input, a stop-operation-control input, and an output;

(d) start-operation control signal generating means including a plurality of inputs, each connected to an output, respectively, of said controllably variable delay means, and an output connected to the start-operation control input of each of said control generator means for starting the operation of each of said control signal generator means when the first occurring 0-bit/1-bit transition is received from any one of the channels;

(e) a plurality of end-operation control signal generating means, each having an input connected to the output of one of said controllably variable delay means and an output connected to the stop-operation control input of the associated control signal generator means for stopping operation of said associated control signal generator means when the first 0-bit/1-bit transition is received from the associated channel;

(f) means for connecting the outputs of each of said control signal generator means to the control input of its associated controllably variable delay means.

2. The apparatus according to claim 1, wherein each of said control signal generator means comprises an integrating circuit means having an input connected to the output of the associated controllably variable delay means, an output, a start-integrating control input connected to the output of said start-operation control signal generating means, a stop-integrating control input connected to the output of the associated end-operation control signal generating means for generating a ramp voltage having an amplitude related to the period of time between the control start and end of the integration of the signal received from the associated delay means, and a holding circuit means including an input connected to the output of said integrating circuit means and an output connected to the control input of the associated controllably variable delay means.

3. The apparatus of claim 2, wherein said holding circuit means comprises counters arranged to operate variable shift registers.

4. The apparatus of claim 2, wherein said holding circuit means comprises servo-controlled potentiometers arranged to operate monostable switch circuits.

5. The apparatus of claim 1, wherein said start-operation control signal generating means comprises a first OR-circuit including a plurality of inputs each connected to the output of one of said controllably variable delay means, respectively, and an output, a second OR-circuit having a pluarlity of inputs each connected to the output of one said end-operation control signal generating means and an output, an AND-circuit having first and second inputs and an output, means for connecting the first input of said AND-circuit to the output of said first OR-circuit, means for connecting the second input of said AND-circuit to the output of said second OR-circuit, and means for connecting the output of said AND-circuit to the stop-operation control input of each of said control signal generator means.

6. The apparatus of claim 5, wherein said means for connecting the second input of said AND-circuit to the output of said second OR-circuit comprises a monostable switch circuit having an input connected to the output of said second OR-circuit and an output, and a differentiating circuit having an input connected to the output of said monostable switch circuit and an output connected to the second input of said AND-circuit.

7. The apparatus of claim 1, wherein each of said end-operation control signal generating means comprises a monostable switch circuit having an input connected to the output of the associated controllably variable delay means and an output, and a differentiating circuit having an input connected to the output of said monostable switch circuit and an output connected to the stop-operation control input of the associated control signal generator means.

References Cited

UNITED STATES PATENTS

| | | | |
|---|---|---|---|
| 3,235,809 | 2/1966 | Alsberg et al. | 328—155 |
| 3,327,299 | 6/1967 | Johnson | 333—18 X |
| 3,335,223 | 8/1967 | Johannesson et al. | 178—69 |

ROBERT L. GRIFFIN, Primary Examiner

BENEDICT V. SAFOUREK, Assistant Examiner

U.S. Cl. X.R.

325—65; 328—163